US00RE46793E

(19) United States
(12) Reissued Patent
Kellner et al.

(10) Patent Number: US RE46,793 E
(45) Date of Reissued Patent: Apr. 17, 2018

(54) WIPER PLUG ELEMENTS AND METHODS OF STIMULATING A WELLBORE ENVIRONMENT

(71) Applicant: BAKER HUGHES INCORPORATED, Houston, TX (US)

(72) Inventors: Justin C. Kellner, Pearland, TX (US); Paul Madero, Edmond, OK (US); Charles C. Johnson, League City, TX (US)

(73) Assignee: BAKER HUGHES, A GE COMPANY, LLC, Houston, TX (US)

(21) Appl. No.: 14/935,706

(22) Filed: Nov. 9, 2015

Related U.S. Patent Documents

Reissue of:
(64) Patent No.: 9,016,388
Issued: Apr. 28, 2015
Appl. No.: 13/366,076
Filed: Feb. 3, 2012

(51) Int. Cl.
*E21B 34/10* (2006.01)
*E21B 34/14* (2006.01)
(Continued)

(52) U.S. Cl.
CPC ..... *E21B 34/10* (2013.01); *E21B 34/063* (2013.01); *E21B 34/102* (2013.01);
(Continued)

(58) Field of Classification Search
CPC ..... E21B 34/10; E21B 34/108; E21B 34/14; E21B 34/102; E21B 34/063; E21B 33/08
(Continued)

(56) References Cited

U.S. PATENT DOCUMENTS 1,883,071 A 10/1932 Stone
2,117,534 A 5/1938 Baker
(Continued)

FOREIGN PATENT DOCUMENTS

CA 2460712 4/2005
EP 0518371 A3 12/1992
(Continued)

OTHER PUBLICATIONS

D.W. Thomson, et al., Design and Installation of a Cost-Effective Completion System for Horizontal Chalk Wells Where Multiple Zones Require Acid Stimulation, SPE Drilling & Completion, Sep. 1998, pp. 151-156, Offshore Technology Conference, U.S.A.

(Continued)

*Primary Examiner* — Kenneth J Whittington
(74) *Attorney, Agent, or Firm* — Parsons Behle & Latimer

(57) ABSTRACT

Methods for preparing a wellbore casing for stimulation operations comprise the steps of cementing a wellbore casing in a wellbore, the wellbore casing having a downhole tool comprising a valve and an apparatus for restricting fluid flow through the valve, such as a ball seat, disposed above the valve. Actuation of the valve opens the valve to establish fluid communication between the wellbore casing and the formation. A plug element is disposed on a seat of the ball seat and a casing pressure test is performed. The plug element then dissolves or disintegrates over time increasing fluid communication between the wellbore casing and the formation, thereby preparing the wellbore casing for stimulation operations without additional wellbore intervention after the casing pressure test. In certain embodiments, during or after dissolution of the plug element, clean-out of the bore of the valve is performed by the plug element.

20 Claims, 5 Drawing Sheets

(51) Int. Cl.
*E21B 34/06* (2006.01)
*E21B 34/08* (2006.01)
*E21B 33/08* (2006.01)

(52) U.S. Cl.
CPC ..... *E21B 34/108* (2013.01); *E21B 34/14* (2013.01); *E21B 33/08* (2013.01)

(58) Field of Classification Search
USPC ..... 166/177.4, 177.5, 192, 193, 316, 317, 166/318
See application file for complete search history.

(56) References Cited

U.S. PATENT DOCUMENTS 2,117,539 A 5/1938 Baker et al.
2,769,454 A 11/1956 Bletcher et al.
2,822,757 A 2/1958 Coberly
2,829,719 A 4/1958 Clark, Jr.
2,857,972 A 10/1958 Baker et al.
2,973,006 A 2/1961 Nelson
3,007,527 A 11/1961 Nelson
3,013,612 A 12/1961 Angel
3,043,903 A 7/1962 Keane et al.
3,090,442 A 5/1963 Cochran et al.
3,211,232 A * 10/1965 Grimmer ..... 166/194
3,220,481 A 11/1965 Park
3,220,491 A 11/1965 Mohr
3,503,445 A 3/1970 Cochrum et al.
3,510,103 A 5/1970 Carsello
3,566,964 A 3/1971 Livingston
3,667,505 A 6/1972 Radig
3,727,635 A 4/1973 Todd
3,776,258 A 12/1973 Dockins, Jr.
3,901,315 A 8/1975 Parker et al.
4,114,694 A 9/1978 Dinning
4,160,478 A 7/1979 Calhoun et al.
4,194,566 A 3/1980 Maly
4,291,722 A 9/1981 Churchman
4,292,988 A 10/1981 Montgomery
4,311,163 A 1/1982 Langevin
4,314,608 A 2/1982 Richardson
4,374,543 A 2/1983 Richardson
4,390,065 A 6/1983 Richardson
4,448,216 A 5/1984 Speegle et al.
4,478,279 A 10/1984 Puntar et al.
4,510,994 A 4/1985 Pringle
4,520,870 A 6/1985 Pringle
4,537,255 A 8/1985 Regalbuto et al.
4,537,383 A 8/1985 Fredd
4,576,234 A 3/1986 Upchurch
4,583,593 A * 4/1986 Zunkel et al. ..... 166/382
4,669,538 A 6/1987 Szarka
4,729,432 A 3/1988 Helms
4,823,882 A 4/1989 Stokley et al.
4,826,135 A 5/1989 Mielke
4,828,037 A 5/1989 Lindsey et al.
4,848,691 A 7/1989 Muto et al.
4,862,966 A 9/1989 Lindsey et al.
4,893,678 A * 1/1990 Stokley et al. ..... 166/374
4,915,172 A 4/1990 Donovan et al.
4,949,788 A 8/1990 Szarka et al.
4,991,654 A 2/1991 Brandell et al.
5,056,599 A 10/1991 Comeaux et al.
5,146,992 A 9/1992 Baugh
5,156,220 A * 10/1992 Forehand et al. ..... 166/386
5,244,044 A 9/1993 Henderson
5,246,203 A 9/1993 McKnight et al.
5,297,580 A 3/1994 Thurman
5,309,995 A 5/1994 Gonzalez et al.
5,316,084 A * 5/1994 Murray et al. ..... 166/332.4
5,333,689 A 8/1994 Jones et al.
5,335,727 A 8/1994 Cornette et al.
5,413,180 A 5/1995 Ross et al.
5,479,986 A 1/1996 Gano et al.
5,501,276 A 3/1996 Weaver et al.
5,558,153 A 9/1996 Holcombe et al.
5,577,560 A 11/1996 Coronado et al.
5,607,017 A 3/1997 Owens et al.
5,623,993 A 4/1997 Van Buskirk et al.
5,685,372 A 11/1997 Gano
5,704,393 A 1/1998 Connell et al.
5,709,269 A 1/1998 Head
5,762,142 A 6/1998 Connell et al.
5,765,641 A 6/1998 Shy et al.
5,813,483 A 9/1998 Latham et al.
5,960,881 A 10/1999 Allamon et al.
5,992,289 A 11/1999 George et al.
6,003,607 A 12/1999 Hagen et al.
6,026,903 A 2/2000 Shy et al.
6,050,340 A 4/2000 Scott
6,053,248 A 4/2000 Ross
6,053,250 A 4/2000 Echols
6,062,310 A 5/2000 Wesson et al.
6,076,600 A 6/2000 Vick, Jr. et al.
6,079,496 A 6/2000 Hirth
6,102,060 A 8/2000 Howlett et al.
6,155,350 A 12/2000 Melenyzer
6,161,622 A 12/2000 Robb et al.
6,189,618 B1 * 2/2001 Beeman et al. ..... E21B 34/14 166/194
6,220,350 B1 4/2001 Brothers et al.
6,279,656 B1 8/2001 Sinclair et al.
6,289,991 B1 9/2001 French
6,293,517 B1 9/2001 Cunningham
6,382,234 B1 5/2002 Birkhead et al.
6,397,950 B1 6/2002 Streich et al.
6,431,276 B1 8/2002 Robb et al.
6,457,517 B1 10/2002 Goodson et al.
6,467,546 B2 10/2002 Allamon et al.
6,530,574 B1 3/2003 Bailey et al.
6,547,007 B2 4/2003 Szarka et al.
6,634,428 B2 10/2003 Krauss et al.
6,666,273 B2 12/2003 Laurel
6,668,933 B2 12/2003 Kent
6,708,946 B1 3/2004 Edwards et al.
6,763,892 B2 * 7/2004 Kaszuba ..... 166/373
6,779,600 B2 8/2004 King et al.
6,834,726 B2 12/2004 Giroux et al.
6,848,511 B1 2/2005 Jones et al.
6,866,100 B2 3/2005 Gudmestad et al.
6,896,049 B2 5/2005 Moyes
6,926,086 B2 8/2005 Patterson et al.
6,966,368 B2 * 11/2005 Farquhar ..... 166/128
7,021,389 B2 4/2006 Bishop et al.
7,093,664 B2 8/2006 Todd et al.
7,150,326 B2 12/2006 Bishop et al.
7,311,118 B2 12/2007 Doutt
7,316,274 B2 * 1/2008 Xu et al. ..... 166/285
7,322,417 B2 * 1/2008 Rytlewski et al. ..... 166/313
7,325,617 B2 2/2008 Murray
7,350,582 B2 4/2008 McKeachnie et al.
7,353,879 B2 4/2008 Todd et al.
7,395,856 B2 7/2008 Murray
7,416,029 B2 8/2008 Telfer et al.
7,464,764 B2 12/2008 Xu
7,469,744 B2 12/2008 Ruddock et al.
7,503,392 B2 3/2009 King et al.
7,625,846 B2 12/2009 Cooke, Jr.
7,628,210 B2 12/2009 Avant et al.
7,640,991 B2 1/2010 Leising
7,644,772 B2 * 1/2010 Avant et al. ..... 166/373
7,866,402 B2 * 1/2011 Williamson, Jr. ..... 166/374
8,276,675 B2 10/2012 Williamson et al.
8,657,015 B2 * 2/2014 Patel ..... E21B 34/06 166/316
2002/0162661 A1 11/2002 Krauss et al.
2003/0037921 A1 2/2003 Goodson
2003/0141064 A1 7/2003 Roberson, Jr.
2003/0168214 A1 9/2003 Sollesnes
2004/0108109 A1 6/2004 Allamon et al.
2005/0061372 A1 3/2005 McGrath et al.
2005/0092363 A1 5/2005 Richard et al.
2005/0092484 A1 5/2005 Evans

(56) References Cited

U.S. PATENT DOCUMENTS

2005/0126638 A1 6/2005 Gilbert
2005/0161224 A1 7/2005 Starr et al.
2005/0205264 A1 9/2005 Starr et al.
2005/0205265 A1 9/2005 Todd et al.
2005/0205266 A1 9/2005 Todd et al.
2005/0281968 A1 12/2005 Shanholtz et al.
2006/0021748 A1 2/2006 Swor et al.
2006/0124312 A1* 6/2006 Rytlewski ..... E21B 23/02 166/313
2006/0131031 A1 6/2006 McKeachnie et al.
2006/0175092 A1 8/2006 Mashburn
2006/0207764 A1* 9/2006 Rytlewski ..... E21B 23/02 166/313
2006/0213670 A1 9/2006 Bishop et al.
2006/0243455 A1 11/2006 Telfer et al.
2006/0266518 A1 11/2006 Woloson
2007/0023087 A1 2/2007 Krebs et al.
2007/0029080 A1 2/2007 Moyes
2007/0062706 A1 3/2007 Leising
2007/0074873 A1 4/2007 McKeachnie et al.
2007/0169935 A1 7/2007 Akbar et al.
2007/0181224 A1* 8/2007 Marya et al. ..... 148/400
2007/0251698 A1* 11/2007 Gramstad et al. ..... 166/376
2007/0295507 A1 12/2007 Telfer
2008/0017375 A1 1/2008 Wardley
2008/0066923 A1 3/2008 Xu
2008/0066924 A1 3/2008 Xu
2008/0217025 A1 9/2008 Ruddock et al.
2009/0025927 A1 1/2009 Telfer
2009/0044946 A1 2/2009 Schasteen et al.
2009/0044948 A1 2/2009 Avant et al.
2009/0044949 A1 2/2009 King et al.
2009/0044955 A1 2/2009 King et al.
2009/0107684 A1 4/2009 Cooke, Jr.
2010/0032151 A1 2/2010 Duphorne
2010/0132954 A1 6/2010 Telfer
2010/0252280 A1 10/2010 Swor et al.
2011/0017458 A1* 1/2011 East et al. ..... 166/308.1
2011/0132143 A1 6/2011 Xu et al.
2011/0132612 A1 6/2011 Agrawal et al.
2011/0132619 A1 6/2011 Agrawal et al.
2011/0132620 A1 6/2011 Agrawal et al.
2011/0132621 A1 6/2011 Agrawal et al.
2011/0135530 A1 6/2011 Xu et al.
2011/0135953 A1 6/2011 Xu et al.
2011/0136707 A1 6/2011 Xu et al.
2011/0187062 A1 8/2011 Xu
2011/0192607 A1 8/2011 Hofman et al.
2011/0247833 A1* 10/2011 Todd et al. ..... 166/386
2011/0315390 A1 12/2011 Guillory et al.
2012/0012771 A1 1/2012 Korkmaz et al.
2012/0048556 A1 3/2012 O'Connell et al.
2012/0181032 A1* 7/2012 Naedler et al. ..... E21B 43/26 166/308.1
2012/0199341 A1* 8/2012 Kellner et al. ..... 166/194
2012/0227980 A1 9/2012 Fay
2012/0261115 A1 10/2012 Xu
2012/0261140 A1 10/2012 Xu
2012/0305236 A1 12/2012 Gouthaman
2012/0312557 A1 12/2012 King
2013/0025872 A1* 1/2013 Mailand et al. ..... 166/332.1
2013/0105175 A1* 5/2013 Mailand et al. ..... 166/373
2013/0140479 A1 6/2013 Solfronk et al.
2013/0146144 A1 6/2013 Joseph et al.
2013/0175052 A1* 7/2013 Baihly ..... E21B 33/134 166/386

FOREIGN PATENT DOCUMENTS

WO WO/02 068793 A1 9/2002
WO WO 03006787 A1 1/2003

OTHER PUBLICATIONS

H.A. Nasr-E1-Din, et al., Laboratory Evaluation Biosealers, Feb. 13, 2001, pp. 1-11, SPE 65017, Society of Petroleum Engineers Inc., U.S.A.
Baker Hughes Incorporated. Model "E" Hydro-Trip Pressure Sub, Product Family No. H79928, Sep. 25, 2003, pp. 1-4, Baker Hughes Incorporated, Houston, Texas USA.
Innicor Completion Systems, HydroTrip Plug Sub, Product No. 6580000, Jul. 26, 2004, p. 1, Innicor Completion Systems, Canada.
K.L. Smith, et al., "Ultra-Deepwater Production Systems Technical Progress Report," U.S. Department of Energy, Science and Technical Information, Annual Technical Progress Report, Jan. 2005, pp. 1-32, ConocoPhillips Company, U.S.A.
X. Li, et al., An Integrated Transport Model for Ball-Sealer Diversion in Vertical and Horizontal Wells, Oct. 9, 2005, pp. 1-9, SPE 96339, Society of Petroleum Engineers, U.S.A.
G.L. Rytlewski, A Study of Fracture Initiation Pressures in Cemented Cased Hole Wells Without Perforations, May 15, 2006, pp. 1-10, SPE 100572, Society of Petroleum Engineers, U.S.A.
StageFRAC Maximize Reservoir Drainage, 2007, pp. 1-2, Schlumberger, U.S.A.
Brad Musgrove, Multi-Layer Fracturing Solution Treat and Produce Completions, Nov. 12, 2007, pp. 1-23, Schlumberger, U.S.A.
Baker Hughes Incorporated, New Baker Hughes Multistage Stimulation Technologies Enhance Unconventional Hydrocarbon Recovery, Nov. 9, 2011, pp. 1-2, URL http://www.Bakerhughes.com/news-and-media/media-center/press-releases/houston-texas-nov-9-2011-multistage, as accessed on Dec. 14, 2011, Baker Hughes Incorporated, U.S.A.
Baker Hughes Incorporated, IN-Tallic Disintegrating Frac Balls—Divert treatment and prevent wellbore blockage for unimpeded production, 2011, pp. 1-2, Baker Hughes Incorporated, U.S.A.

* cited by examiner

WIPER PLUG ELEMENTS AND METHODS OF STIMULATING A WELLBORE ENVIRONMENT

Matter enclosed in heavy brackets [ ] appears in the original patent but forms no part of this reissue specification; matter printed in italics indicates the additions made by reissue; a claim printed with strikethrough indicates that the claim was canceled, disclaimed, or held invalid by a prior post-patent action or proceeding.

BACKGROUND

1. Field of Invention

The present invention is directed to methods of preparing a cased wellbore for stimulation operations and, in particular, to interventionless methods for preparing the cased wellbore for stimulation operations using pressure actuated sleeves and apparatuses for temporarily restricting fluid flow through the wellbore casing to prepare the wellbore casing for stimulation operations as opposed to using additional wellbore intervention methods such as tubing conveyed perforation.

2. Description of Art

Ball seats are generally known in the art. For example, typical ball seats have a bore or passageway that is restricted by a seat. The ball or plug element is disposed on the seat, preventing or restricting fluid from flowing through the bore of the ball seat and, thus, isolating the tubing or conduit section in which the ball seat is disposed. As force is applied to the ball or plug element, the conduit can be pressurized for tubing testing or tool actuation or manipulation, such as in setting a packer. Ball seats are used in cased hole completions, liner hangers, flow diverters, fracturing systems, acid-stimulation systems, and flow control equipment and other systems.

Although the terms "ball seat" and "ball" are used herein, it is to be understood that a drop plug or other shaped plugging device or element may be used with the "ball seats" disclosed and discussed herein. For simplicity it is to be understood that the terms "ball" and "plug element" include and encompass all shapes and sizes of plugs, balls, darts, or drop plugs unless the specific shape or design of the "ball" is expressly discussed.

Stimulating, which as used herein includes fracturing or "fracing," a wellbore using stimulation systems or tools also are known in the art. In general, stimulating systems or tools are used in oil and gas wells for completing and increasing the production rate from the well. In deviated wellbores, particularly those having longer lengths, fluid, such as acid or fracturing fluids, can be expected to be introduced into the linear, or horizontal, end portion of the well to stimulate the production zone to open up production fissures and pores therethrough. For example, hydraulic fracturing is a method of using pump rate and hydraulic pressure created by fracturing fluids to fracture or crack a subterranean formation, or the wellbore environment.

Prior to stimulating a wellbore, a stimulation tool is cemented into the wellbore. Thereafter, a pressure test of the wellbore casing containing the stimulation tool is performed. To perform this step, the pathway through the stimulation tool must be closed off. After the casing test establishes the integrity of the wellbore casing, fluid communication of the pathway through the stimulation tool is reestablished so that the stimulation fluid can be pumped down through the stimulation tool and into the formation.

Currently, the steps involved in reestablishing fluid flow through the stimulation tool require additional wellbore intervention such as by using tubing conveyed perforation.

SUMMARY OF INVENTION

Broadly, the methods for preparing a wellbore for stimulation operations disclosed herein comprise the steps of cementing into a wellbore casing a downhole tool comprising a valve having an apparatus for restricting fluid flow through the valve, such as a ball seat, disposed above the valve. The valve is actuated to its opened position to establish fluid flow between the casing bore and the formation or wellbore environment. Thereafter, a plug element is disposed on the seat of the ball seat and a casing pressure test is performed. The plug element then dissolves or disintegrates over time thereby increasing fluid communication between the formation and the wellbore casing through the valve, thereby placing the wellbore casing in condition for stimulation operations without additional wellbore intervention after the casing test.

In one specific embodiment, the plug element also functions as a wiper member to facilitate additional clean-up of the bore of the valve after the pressure test has been performed. The plug element dissolves into a predetermined shape that, when pushed through the seat and the bore of the valve, the plug element wipes away debris within the bore of the valve.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

Figure 1:
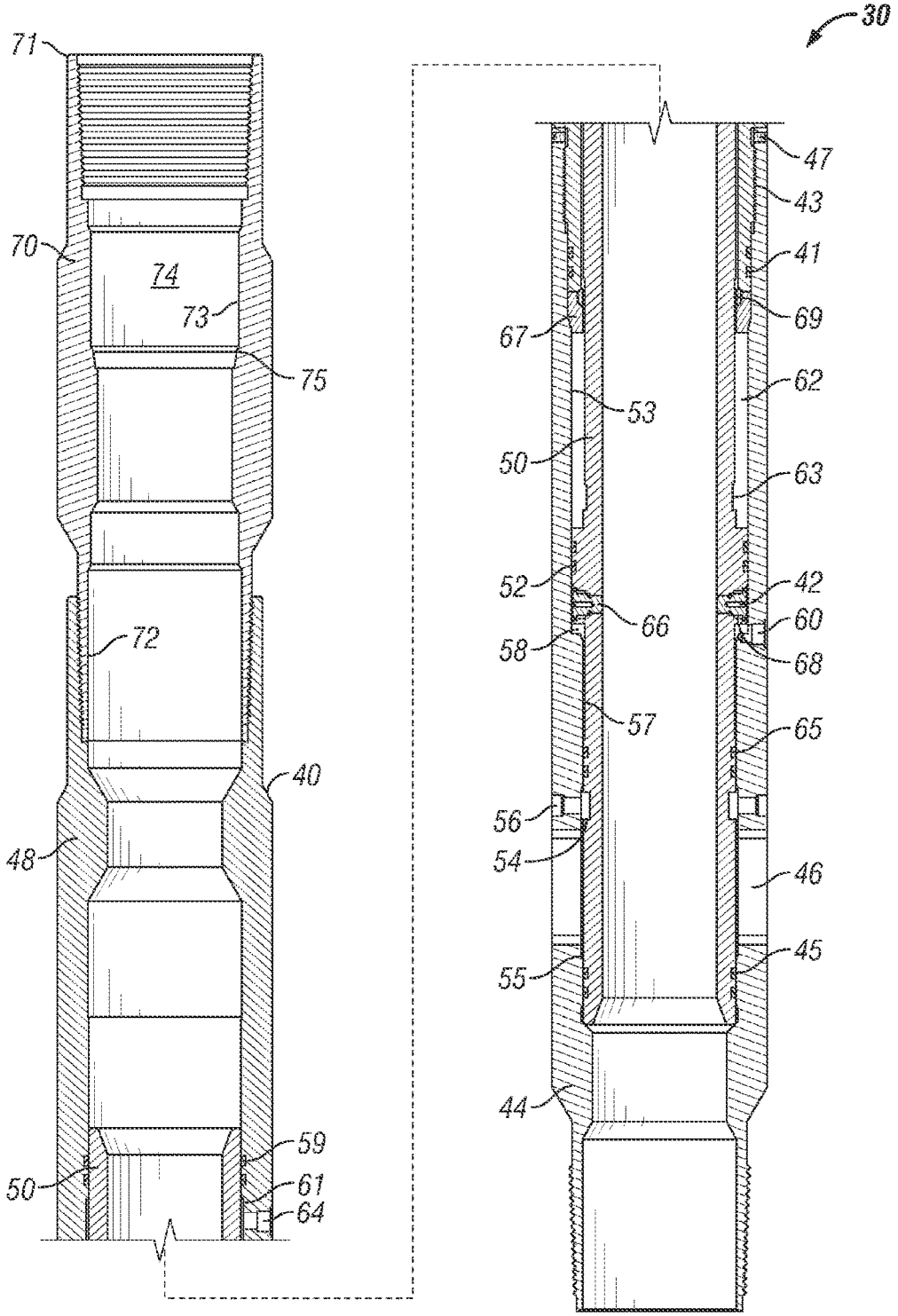
FIG. 1 is a cross-sectional view of one specific embodiment of the downhole tool disclosed herein showing an exemplary valve in its closed position.
Figure 2:
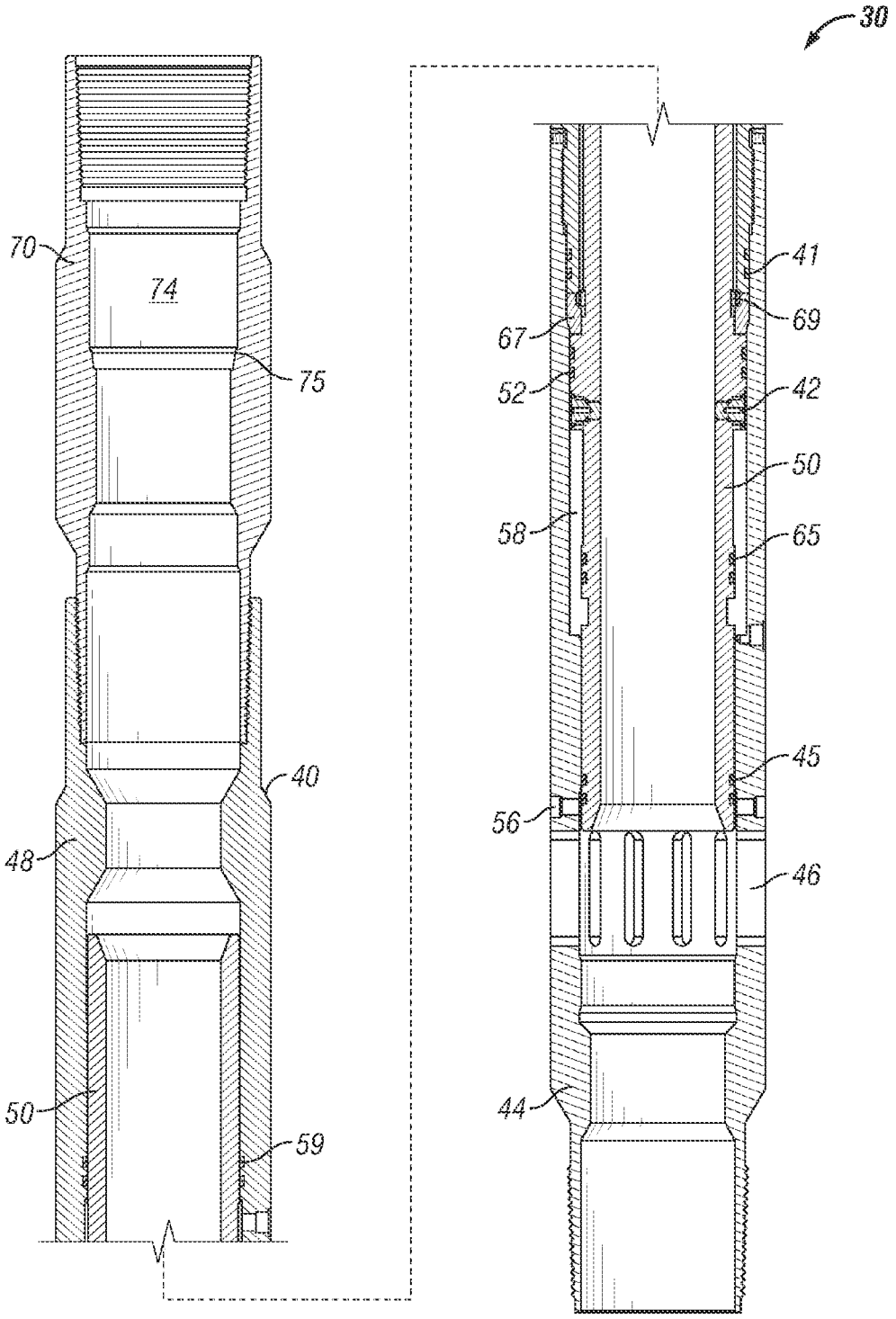
FIG. 2 is a cross-sectional view of the downhole tool of FIG. 1 showing the valve in one of its opened positions.
Figure 3:
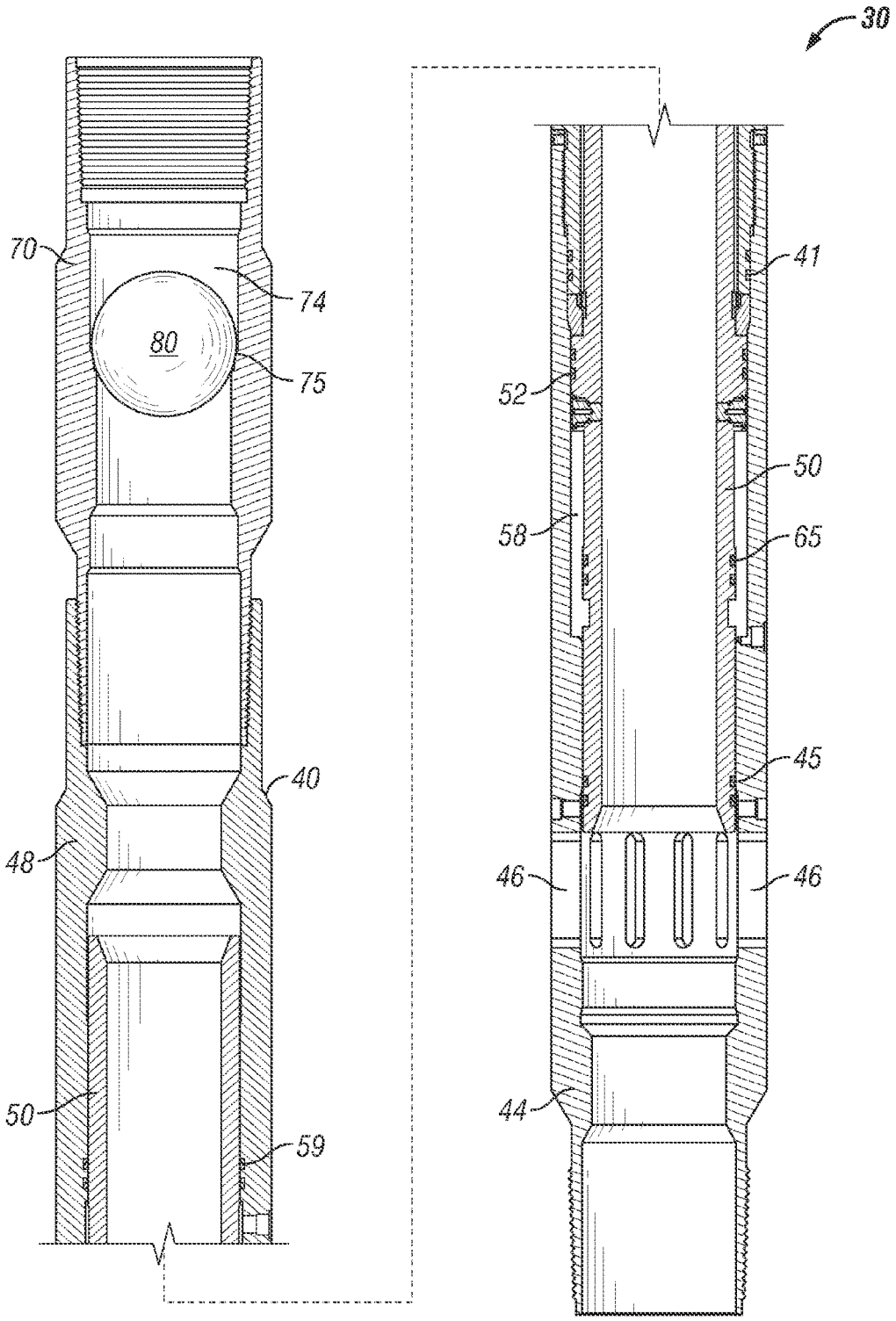
FIG. 3 is a cross-sectional view of the downhole tool of FIG. 1 showing a plug element landed on a seat above the valve so that a casing test can be performed.
Figure 4:
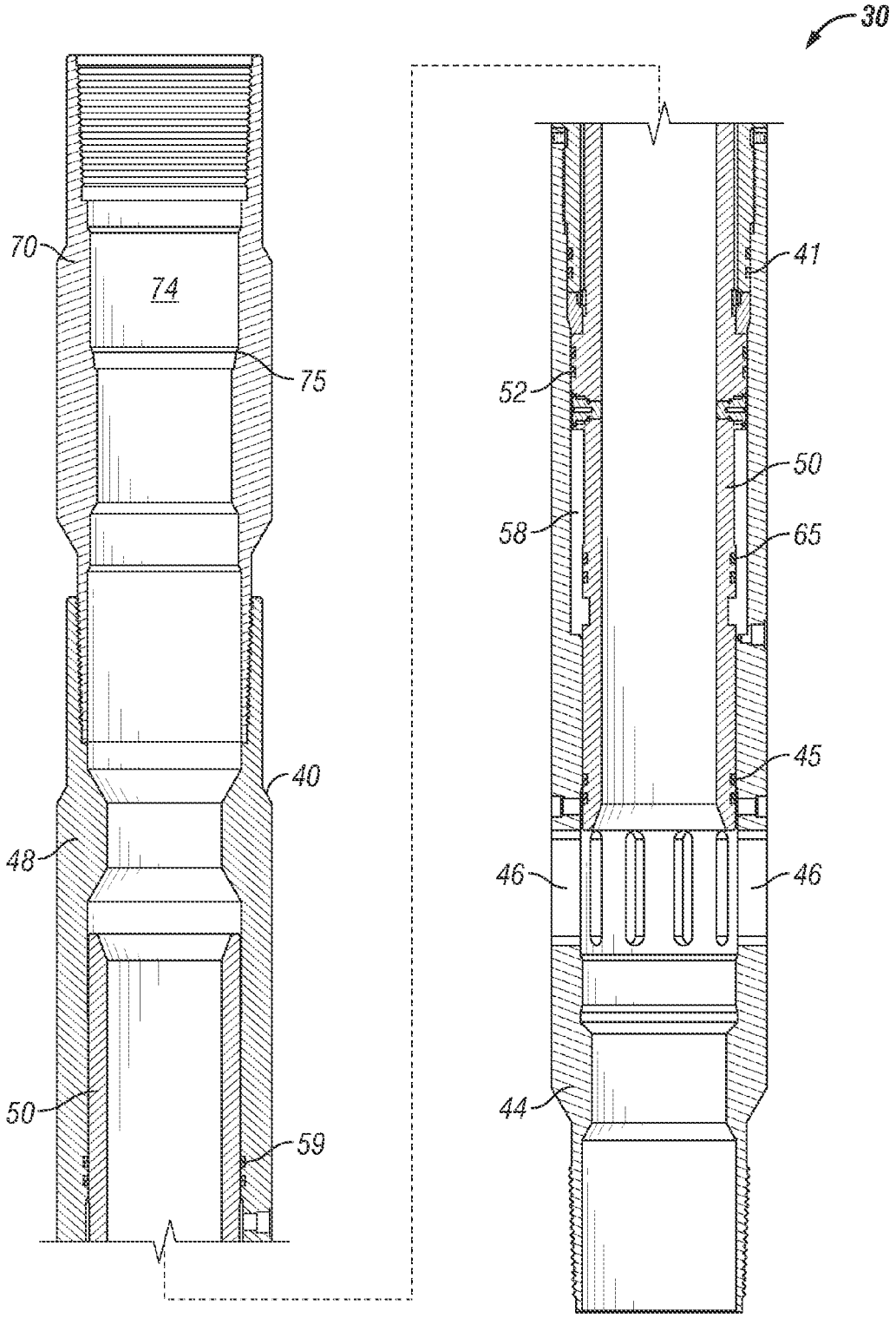
FIG. 4 is a cross-sectional view of the downhole tool of FIG. 1 showing the downhole tool in position for stimulation operations after the pressure test has been performed and the plug element shown in FIG. 3 dissolved.

Referring now to FIGS. 1-4, in one specific embodiment, downhole tool 30 comprises valve 40 and bore restriction apparatus 70, shown as a ball seat in FIGS. 1-4. FIG. 1 shows valve 40 in a closed position, and FIGS. 2-4 show valve 40 actuated to an open position.

Valve 40 includes lower ported housing 44 having fluid communication ports 46, and upper body 48. Pressure integrity of valve 40 is maintained by body seals 41. Body set screws 47 keep the body connection threads 43 from backing out during installation. Captured between lower ported housing 44 and upper body 48 is inner shifting sleeve 50. Inner shifting sleeve 50 has several diameters that create piston areas that generate shifting forces to open valve 40. Port isolation seals 45 located on the lower end of inner shifting sleeve 50 and lower internal bore piston seals 65 above fluid communication ports 46 both act to isolate the inside of valve 40 during and after cementation. Port isolation seals 45 and lower internal bore piston seals 65 operate within their respective polished bores 55, 57 within lower ported housing 44. The larger intermediate internal bore piston seals 52 are used to drive up inner shifting sleeve 50 along the upper internal polished bore 53 within lower ported housing 44 after burst disc 42 is ruptured.

Upper external rod piston seals 59 located within upper body 48 act to prevent cement from entering upper atmospheric chamber 62 and wipe the outside diameter of upper sleeve polished bore 61 during opening of valve 40. Inner shifting sleeve 50 also has shoulder 54 that shears shear screw 56 during the opening shift of inner shifting sleeve 50. External sleeve lock ring retention groove 63 is located between internal bore seals 52 and upper sleeve polished bore 61 diameter. Lock ring retention groove 63 accepts sleeve lock ring 69 that is retained by lock ring retainer 67 after valve 40 has been fully opened. Thus, sleeve lock ring 69 prevents inner shifting sleeve 50 from closing after valve 40 has been opened (FIGS. 2-4).

Located between lower internal bore piston seals 65 and intermediate bore piston seals 52 is lower atmospheric chamber 58 which contains air that can be independently tested through lower pressure test port 60. Located between intermediate internal bore piston seals 52 and upper external rod piston seals 59 is upper atmospheric chamber 62 which also contains air that can be independently tested through upper pressure testing port 64. A rupture or burst disc 42 is held in place within a port located on the outside of inner shifting sleeve 50 by load ring 66 and load nut 68. Burst disc load nut 68 is sized to allow significant torque and load to be transferred into burst disc 42 prior to installation of inner shifting sleeve 50 within valve 40.

Those skilled in the art will appreciate that the use of the rupture disc for piston access is simply the preferred way and generally more accurate than relying exclusively on shearing a shear pin. A pressure regulation valve can also be used for such selective access as well as a chemically responsive barrier that goes away in the presence of a predetermined substance or energy field, temperature downhole or other well condition for example, to move the sleeve. Burst or rupture discs 42 also can be replaced by any other pressure control plug known in the art such as those disclosed and taught in U.S. patent application Ser. No. 13/286,775, filed Nov. 1, 2011, entitled "Frangible Pressure Control Plug, Actuatable Tool, Including Plug, and Method Thereof" which is hereby incorporated by reference in its entirety.

After burst disc 42 is ruptured, lower chamber 58 is under absolute downhole pressure so wall flexure at that location is minimized. Even before burst disc 42 breaks, the size of lower chamber 58 is sufficiently small to avoid sleeve wall flexing in that region. The use of a large boss to support intermediate internal bore piston seals 52 also strengthens inner shifting sleeve 50 immediately below upper chamber 62, thus at least reducing flexing or bending that could put inner shifting sleeve 50 in a bind before it is fully shifted. The slightly larger dimension of external rod piston seals 59 as compared to port isolation seals 45 that hold inner shifting sleeve 50 closed initially also allows a greater wall thickness for inner shifting sleeve 50 near the upper chamber 62 to further at least reducing flexing or bending to allow inner shifting sleeve 50 to fully shift without getting into a bind.

The intermediate internal bore piston seals 52 can be integral to inner shifting sleeve 50 or a separate structure. Upper chamber 62 has an initial pressure of atmospheric or a predetermined value less than the anticipated hydrostatic pressure within inner shifting sleeve 50. The volume of upper chamber 62 decreases and its internal pressure rises as inner shifting sleeve 50 moves to open ports 46.

Ball seat 70 is secured to the upper end of valve 40 through any known device or method in the art, such as a threaded connection. Ball seat 70 comprises upper end 71, lower end 72 which is secured to valve 40, and inner wall surface 73 defining bore 74. Seat 75 is disposed along inner wall surface 73 for receiving a plug element such as ball 80 shown in FIG. 3.

In operation, downhole tool 30 is connected to casing at its upper and lower ends and run in open-hole cementable completions just above float equipment. After being disposed within the wellbore at the desired location, downhole tool 30 is cemented into place within the well.

After cementation, a clean-out operation is performed to remove debris from the flow path through valve 40. The clean-out operation can be performed by pumping fluid through downhole tool 30 to clean up any debris remaining from the cementing operations. In addition, or alternatively, a wiper plug can be transported down the bore of the casing, past seat 75 to and through the bore of valve 40 to wipe away and debris, including residual cement.

After the cement has set on the outside of valve 40, it is ready to be opened with a combination of high hydrostatic and applied pressure. Upon reaching the critical pressure, burst disc 42 is fractured and opens lower atmospheric chamber 58 to the absolute downhole pressure. This pressure acts on the piston area created by lower internal bore piston seals 65 and the larger internal bore piston seals 52 and drives inner shifting sleeve 50 upward compressing the air within upper atmospheric chamber 62 and opening fluid communication ports 46 on the ported housing 44. Thus, the volume of upper chamber 62 decreases and its internal pressure rises as inner shifting sleeve 50 moves to open ports 46.

After inner shifting sleeve 50 is completely shifted and in contact with the downward facing shoulder on lock ring retainer 67, sleeve lock ring 69 falls into sleeve lock retention groove 63 on inner shifting sleeve 50 preventing valve 40 from subsequently closing.

After burst disc 42 is fractured, absolute downhole pressure acts on piston seals 52 and piston seals 65 continuously pushing sleeve 50 upward acting as a redundant locking feature preventing valve 40 from subsequently closing.

Upon opening valve 40, fluid communication between the bore of downhole tool 30 and, thus, the wellbore casing string, and the wellbore formation or wellbore environment is established. Thereafter, a pressure test of the casing can be performed. To do so, plug element 80 is transported down the casing string and landed on seat 75 of ball seat 70 (FIG. 3). Afterwards, a pressure test is performed. Presuming the pressure test is successful, then the wellbore is capable of having stimulation operations performed. However, the plug element 80 remains on seat 75. Plug element 80 is removed from seat 75 over time due to the dissolution of at least a portion of plug element 80. After plug element 80 sufficiently dissolves such that fluid pressure acting downward on plug element 80 can push plug element 80 through seat 75 and through the bore of valve 40, fluid communication between the casing string and the formation is increased so that stimulation operations can be performed. Thus, after landing plug element 80 on seat 75 and the pressure test is performed, no additional wellbore intervention is required to place the casing string in condition for stimulation operations.

In certain embodiments, plug element 80 completely dissolves. In other embodiments, plug element 80 partially dissolves before passing through seat 75 and through the bore of valve 40. In still other embodiments, a portion of plug element 80 is formed from a material that is not dissolvable. Dissolution of a portion, or all of plug element 80, can be accomplished by having plug element 80 formed at least in part by a dissolvable material. "Dissolvable" means that the material is capable of dissolution in a fluid or solvent disposed within the wellbore casing. "Dissolvable" is understood to encompass the terms degradable and disintegrable. Likewise, the terms "dissolved" and "dissolution" also are interpreted to include "degraded" and "disintegrated," and "degradation" and "disintegration," respectively. The dissolvable material may be any material known to persons of ordinary skill in the art that can be dissolved, degraded, or disintegrated over an amount of time by a temperature or fluid such as water-based drilling fluids, hydrocarbon-based drilling fluids, or natural gas, and that can be calibrated such that the amount of time necessary for the dissolvable material to dissolve is known or easily determinable without undue experimentation. Suitable dissolvable materials include controlled electrolytic metallic nano-structured materials such as those disclosed in U.S. patent application Ser. No. 12/633,682, filed Dec. 8, 2009 (U.S. Patent Publication No. 2011/0132143), U.S. patent application Ser. No. 12/633,686, filed Dec. 8, 2009 (U.S. Patent Publication No. 2011/0135953), U.S. patent application Ser. No. 12/633,678, filed Dec. 8, 2009 (U.S. Patent Publication No. 2011/0136707), U.S. patent application Ser. No. 12/633,683, filed Dec. 8, 2009 (U.S. Patent Publication No. 2011/0132612), U.S. patent application Ser. No. 12/633,668, filed Dec. 8, 2009 (U.S. Patent Publication No. 2011/0132620), U.S. patent application Ser. No. 12/633,677, filed Dec. 8, 2009 (U.S. Patent Publication No. 2011/0132621), and U.S. patent application Ser. No. 12/633,662, filed Dec. 8, 2009 (U.S. Patent Publication No. 2011/0132619), all of which are hereby incorporated by reference in their entirety.

Additional suitable dissolvable materials include polymers and biodegradable polymers, for example, polyvinylalcohol based polymers such as the polymer HYDROCENE™ available from Idroplax, S.r.l. located in Altopascia, Italy, polylactide ("PLA") polymer 4060D from Nature-Works™, a division of Cargill Dow LLC; TLF-6267 polyglycolic acid ("PGA") from DuPont Specialty Chemicals; polycaprolactams and mixtures of PLA and PGA; solid acids, such as sulfamic acid, trichloroacetic acid, and citric acid, held together with a wax or other suitable binder material; polyethylene homopolymers and paraffin waxes; polyalkylene oxides, such as polyethylene oxides, and polyalkylene glycols, such as polyethylene glycols. These polymers may be preferred in water-based drilling fluids because they are slowly soluble in water.

In calibrating the rate of dissolution of dissolvable material, generally the rate is dependent on the molecular weight of the polymers. Acceptable dissolution rates can be achieved with a molecular weight range of 100,000 to 7,000,000. Thus, dissolution rates for a temperature range of 50° C. to 250° C. can be designed with the appropriate molecular weight or mixture of molecular weights.

Figure 5:
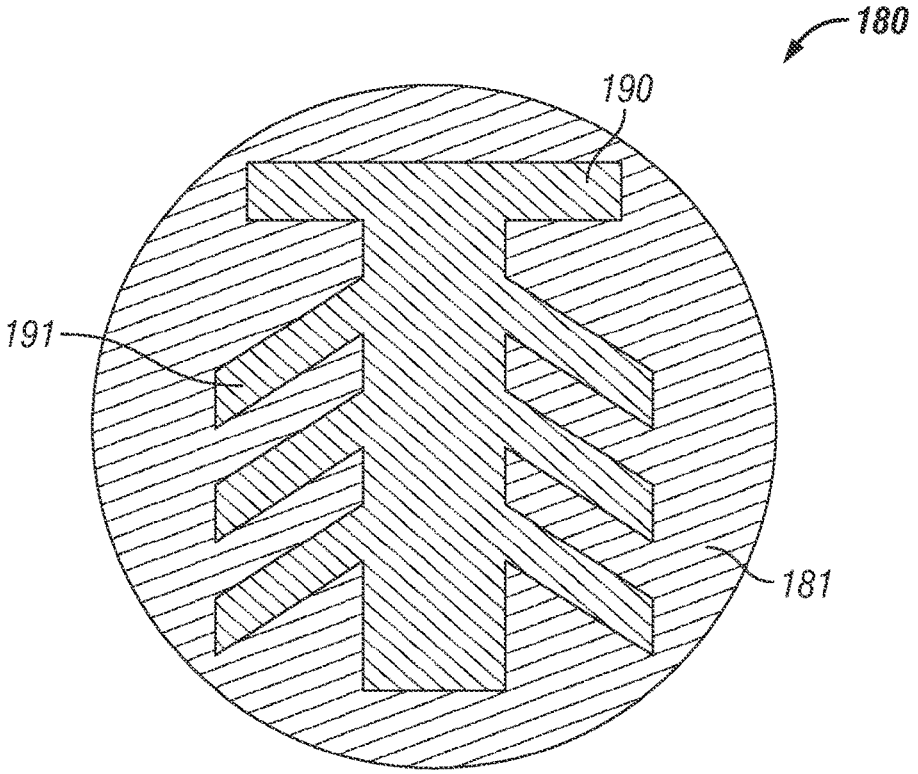
FIG. 5 is a cross-sectional view of a specific embodiment of a plug element as disclosed herein.
Figure 6:
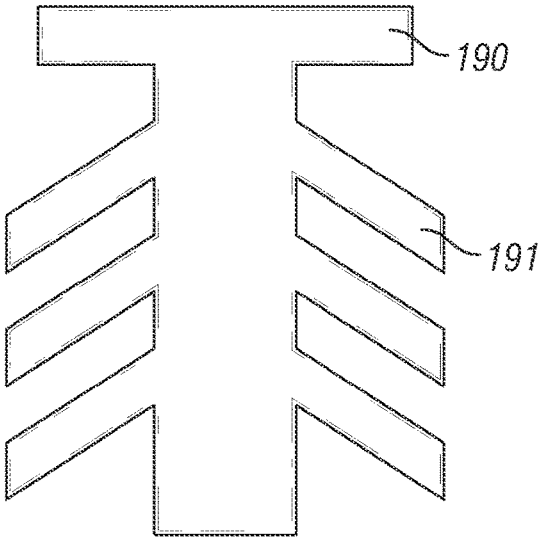
FIG. 6 is a side view of the wiper member shown in FIG. 5.

Referring now to FIGS. 5-6, in an alternative embodiment, plug element 180 comprises an initial shape (FIG. 5) that is capable of landing on seat 75 to restrict fluid flow through seat 75, and a new or second shape (FIG. 6) that is sufficient to act as a wiper member as it passes through seat 75 and/or through the bore of valve 40 and/or the bore of inner shifting sleeve 50 upon partial or complete dissolution of the dissolvable material 181 of plug element 180. In this embodiment, plug element 180 includes wiper member 190 encapsulated by dissolvable material 181. Wiper member 190 can be formed out of a material 191 that can be a non-dissolvable material or a second dissolvable material that dissolves at a slower rate compared to dissolvable material 181. Upon sufficient dissolution of dissolvable material 181, wiper member 190 is capable of being pushed through seat 75 and/or through the bore of valve 40 and/or the bore of inner shifting sleeve 50. In so doing, wiper member 190 wipes or cleans away debris disposed along these surfaces. Thus, a mechanical clean-out of the valve can be performed after the pressure test without additional wellbore intervention.

As discussed above, plug elements 80, 180 can be formed completely out of one or more dissolvable materials or plug elements 80, 180 can be formed partially out of one or more dissolvable materials. In the former embodiment, plug elements 80, 180 will completely dissolve and fluid flow through valve 40 in the wellbore environment will be increased. In the latter embodiment, upon dissolution, plug elements 80, 180 can have a new or second shape that is different from the initial shape of plug element 80 that provided restriction of fluid flow through seat 75. The new shape of plug element 80 can either fall through valve 40 as debris, or it can facilitate wiping or cleaning of the bore of valve 40 by the remaining portion(s) of plug elements 80, 180. Thus, plug elements 80, 180 can remove debris disposed within the valve bore as fluid communication between the wellbore casing and the wellbore environment is increased. In these embodiments, both increase of fluid communication between the wellbore casing and the wellbore environment after removal of plug elements 80, 180, and mechanical clean-out of the valve bore, occur without further wellbore intervention.

It is to be understood that the invention is not limited to the exact details of construction, operation, exact materials, or embodiments shown and described, as modifications and equivalents will be apparent to one skilled in the art. For example, the wiper member can have any shape desired or necessary to pass through the valve to remove debris disposed within the bore of the valve and/or inner shifting sleeve. In addition, the wiper can be formed out of a non-dissolvable material or another dissolvable material. Moreover, the valve is not required to have the structures disclosed herein, nor is the valve required to operate as disclosed herein. Further, the ball seats disclosed herein can be modified as desired or necessary to restrict fluid flow through the wellbore casing. Additionally, dissolvable materials not disclosed herein can be used in place of those that are disclosed herein. Accordingly, the invention is therefore to be limited only by the scope of the appended claims.

What is claimed is:

1. A method of stimulating a wellbore environment, the method comprising:

(a) cementing a wellbore casing within a wellbore, the wellbore casing comprising a valve disposed below a fluid restriction apparatus, the valve in direct contact with the fluid restriction apparatus, the fluid restriction apparatus comprising a tubular member having a seat disposed within a bore of the tubular member and a plug element for landing on the seat;

(b) opening the valve to place the wellbore casing in fluid communication with a wellbore environment;

(c) landing the plug element on the seat to restrict fluid communication between the wellbore casing and the wellbore environment;

(d) [without additional wellbore intervention, removing a portion of the plug element] *dissolving a portion of the plug element before forcing the plug element through the seat and thereby* causing an increase in fluid communication between the wellbore casing and the wellbore environment; and (e) performing a stimulation operation in the wellbore environment.

2. The method of claim 1, wherein during step (d), the plug element is forced [down through the seat and] through a bore of the valve causing debris to be removed from the bore of the valve.

3. The method of claim 2, wherein [during removal of the portion of the plug element,] the plug element is dissolved from a first shape to a second shape, the second shape being defined by a non-dissolvable material.

4. The method of claim 3, wherein the second shape comprises a wiper member.

5. The method of claim 1, wherein the valve is opened during step (b) by fluid pressure actuating the valve.

6. The method of claim 1, wherein [additional wellbore intervention includes] *step (d) is performed without* using tubing conveyed perforations.

7. The method of claim 1, further comprising performing a pressure test of the wellbore casing.

8. A method of stimulating a wellbore environment, the method comprising:

(a) cementing a wellbore casing within a wellbore, the wellbore casing comprising a single downhole tool including a valve and a fluid restriction apparatus, the valve disposed below the fluid restriction apparatus, the fluid restriction apparatus comprising a tubular member having a seat disposed within a bore of the tubular member and a plug element for landing on the seat, the plug element comprising a dissolvable material;

(b) opening the valve to place the wellbore casing in fluid communication with a wellbore environment;

(c) landing the plug element on the seat to restrict fluid communication between the wellbore casing and the wellbore environment;

(d) dissolving a portion of the plug element *before forcing the plug element through the seat, and thereby* causing an increase in fluid communication between the wellbore casing and the wellbore environment; and (e) performing a stimulation operation in the wellbore environment.

9. The method of claim 8, wherein during step (d), the plug element is forced [down through the seat and] through a bore of the valve causing debris to be removed from the bore of the valve.

10. The method of claim 9, wherein during step (d), the plug element is dissolved from a first shape to a second shape, the second shape being defined by a non-dissolvable material.

11. The method of claim 10, wherein the second shape comprises a wiper member.

12. The method of claim 8, wherein the valve is opened during step (b) by fluid pressure actuating the valve.

13. The method of claim 8, further comprising performing a pressure test of the wellbore casing.

*14. A method of stimulating a wellbore environment, the method comprising:*

*opening a valve disposed below a fluid restriction apparatus of a cemented wellbore casing within a wellbore, the valve in direct contact with the fluid restriction apparatus, the fluid restriction apparatus comprising a tubular member having a seat disposed within a bore of the tubular member and a plug element for landing on the seat, wherein opening the valve places the wellbore casing in fluid communication with a wellbore environment;*

*landing the plug element on the seat to restrict fluid communication between the wellbore casing and the wellbore environment;*

*forcing the plug element through the seat after dissolving a portion of the plug element and thereby causing an increase in fluid communication between the wellbore casing and the wellbore environment; and*

*performing a stimulation operation in the wellbore environment.*

*15. The method of claim 14, wherein during removal of the portion of the plug element, the plug element is forced through a bore of the valve causing debris to be removed from the bore of the valve.*

*16. The method of claim 15, wherein the plug element is dissolved from a first shape to a second shape, the second shape being defined by a non-dissolvable material.*

*17. The method of claim 16, wherein the second shape comprises a wiper member.*

*18. The method of claim 14, wherein the valve is opened by fluid pressure actuating the valve.*

*19. The method of claim 14, wherein causing an increase in fluid communication between the wellbore casing and the wellbore environment is performed without using tubing conveyed perforations.*

*20. The method of claim 14, further comprising performing a pressure test of the wellbore casing.*

* * * * *